United States Patent [19]
Denis et al.

[11] 3,708,667
[45] Jan. 2, 1973

[54] INSTRUMENT FOR MEASURING THE SOLAR ENERGY ABSORBED BY THE EARTH AND THE PLANTS

[75] Inventors: Pierre M. Denis, Grenoble; Roger Guicherd, Saint-Egreve, both of France

[73] Assignee: Commissariat A l'Energie Atomique, Paris, France

[22] Filed: Sept. 7, 1971

[21] Appl. No.: 177,965

[30] Foreign Application Priority Data

Sept. 9, 1970 France..............................7032461

[52] U.S. Cl...........................................250/83.3 H
[51] Int. Cl............................................G01t 1/16
[58] Field of Search..73/355; 250/83 R, 83.3 H, 211; 136/206, 120; 128/391, 404

[56] References Cited

UNITED STATES PATENTS

| | | | |
|---|---|---|---|
| 3,433,953 | 3/1969 | Sweet | 73/355 |
| 3,431,149 | 3/1969 | Robinson | 73/355 |
| 3,098,380 | 7/1963 | Svomi | 73/355 |
| 3,131,304 | 4/1964 | Hager | 73/355 |

*Primary Examiner*—James W. Lawrence
*Assistant Examiner*—D. C. Nelms
*Attorney*—Cameron, Kerkam & Sutton

[57] ABSTRACT

An instrument for measuring the solar energy absorbed by the earth includes a flat conductive element defining opposed faces each provided with a layer capable of absorbing solar radiation. The conductive element includes a central layer capable of being maintained at a constant temperature close to ambient temperature. In use the instrument is positioned with one absorbent layer receiving solar radiation and the other radiation reflected from the surface, the difference in thermal fluxes from the two layers being measured using a thermocouple circuit.

7 Claims, 4 Drawing Figures

INSTRUMENT FOR MEASURING THE SOLAR ENERGY ABSORBED BY THE EARTH AND THE PLANTS

The invention relates to an instrument for measuring the solar energy absorbed by a surface such as the ground and plants.

Known instruments for carrying out such measurements, usually known as bolometers, are formed essentially of a conductive disc having an upwardly facing surface layer which will absorb all solar radiation (ultra-violet, visible radiation and infra-red), the solar radiation not absorbed by the ground being absorbed by a downwardly facing surface layer. The measurement of the heat balance difference between the two absorbent layers indicates the quantity of energy absorbed by the ground.

The convection to which these instruments are subject in the atmosphere prevents them from being very accurate. Known designs either do not allow for this convection, which is therefore a source of serious errors, or use forced convection which is still affected by climatic conditions.

It has been proposed to shelter the measururing surface layers with hemispheres to obviate convection. However, these hemispheres are necessarily transparent to both visible and infra-red radiation, so that, though they provide satisfactory protection against wind and rain, there may be steep temperature gradients within them, such temperature gradients giving rise to internal convection and to heat exchange with the exterior both of which distort the measurements.

The internal convection cannot be eliminated or even substantially reduced without keeping the measuring surface layers at temperatures similar to the ambient temperature and therefore to one another.

According to the present invention there is provided an instrument for measuring the solar energy absorbed by a surface, the instrument including a flat thermally conductive element defining a pair of opposed faces, a first layer capable of absorbing solar radiation applied to one face of the element and a second layer capable of absorbing radiation reflected off the surface applied to the other face of the element the element including a central thermally conductive layer, capable of being maintained at a temperature close to ambient temperature by means of a flow of fluid, and insulating layers separating the central layer from the absorbent layers whose thermal decrements are such that the temperatures of the absorbent layers can be maintained close to ambient temperature, and wherein the instrument includes thermocouples circuit means adapted to measure the difference between thermal fluxes from each of the absorbent layers.

Further features and advantages of the invention will become apparent from the following description of an embodiment thereof, given with reference to the accompanying drawings by way of explanation only.

Figure 1:
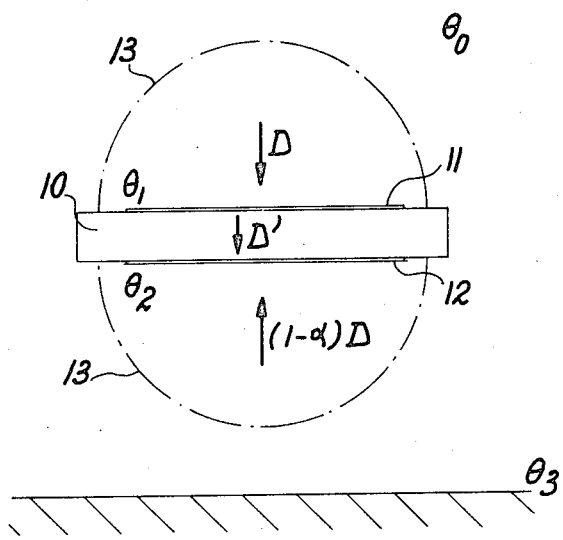
FIG. 1 is a diagrammatic vertical section through a conventional instrument.

In FIG. 1 reference 10 designates a flat thermal conductor, for example a copper disc, 11 designates a layer which absorbs solar radiation which has passed through the atmosphere and 12 designates a layer which absorbs the radiation reflected off the ground. The instrument is placed above the ground and is protected by two hemispheres 13 transparent to visible, ultra-violet and infra-red radiation.

Various notations used in the description will now be defined:

$D$ designates the solar flux density;

$D'$ is the thermal flux density across the thermal conductor 10;

$K$ is the thermal conductivity of this conductor;

$a$ is its thickness;

$\alpha$ is that part of the solar energy absorbed by the ground;

$\theta_0$ is the temperature of the atmosphere;

$\theta_1$ is the temperature of the upper layer 11;

$\theta_2$ is the temperature of the lower layer 12;

$\theta_3$ is the temperature of the surface of the ground on immediate contact with the atmosphere;

$\sigma$ is the Stefan's law constant.

It can be shown that the energy balance of the instrument shown in FIG. 1 is as follows:

$$D + \sigma\theta_0^4 = D' + \theta_1^4$$

$$D' + (1-\alpha)D + \sigma\theta_3^4 = \sigma\theta_2^4 \quad D' = \frac{K}{a}(\theta_1 - \theta_2)$$

Figure 2:
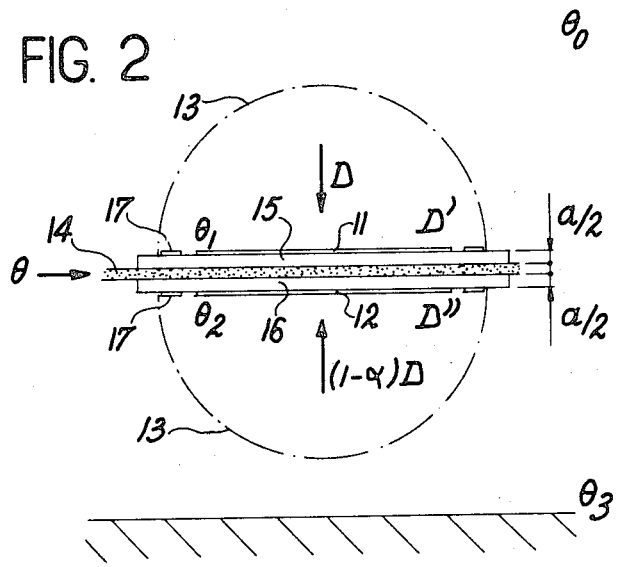
FIG. 2 is a diagrammatic vertical section through an instrument embodying the invention.

In accordance with the invention, the instrument shown in FIG. 1 is modified by providing, as shown in FIG. 2, a thin, hollow central conductive layer 14 through which fluid flows to keep the layer 14 at a temperature $\theta$ similar to the ambient temperature. The instrument can then be regarded as being divided into two portions, viz.: a top half of approximate thickness $a/2$ with thermal flux of density $D'$ transverse relative to a layer 15, and a bottom half, also of approximate thickness $a/2$, with thermal flux of density $D''$ transverse relative to a layer 16.

Assuming that the instrument is still protected by the transparent hemispheres 13, the energy balance of each of the two halves of the instrument is then as follows:

Top half:

$$D + \sigma\theta_0^4 = D' + o\theta_1^4 \quad (1)$$

$$D' = (2K/a) \cdot (\theta_1 - \theta)$$

Bottom half:

$$(1-\alpha)D + \sigma\theta_3^4 = D'' + \sigma\theta_2^4$$

$$D'' = (2K/a)(\theta_2 - \theta) \quad (2)$$

Assuming $K$ to be the *in both halves, the difference in thermal flux densities DD' and D''*, $$D' - D'' = (2K/a)(\theta_1 - \theta_2) \quad (3)$$

is found to have a value independent of $\theta$. This value can be measured by means of a thermocouple since it is the difference between the internal thermal fluxes from the upper and lower absorbent surfaces.

Since this value is independent of $\theta$, $\theta$ can be given any value. A temperature equal or very similar to the ambient temperature will therefore be chosen, so cancelling or minimizing the effect of convection.

If in addition the value $\theta_1 - \theta_2$ is calculated from equations (1) and (2), assuming that $$\delta = \theta_1 - \theta_2,$$

the resulting expression shows that $\delta$ is proportional to the energy absorbed by the ground, provided that, firstly, $\delta$ is small enough to permit terms including $\delta$ to a power greater than 1 to be ignored, and, secondly, $$4\theta_1^3 << (2K/a\sigma):$$

This means, finally, that $\theta_1$ and $\theta_2$ must, like $\theta$, be temperatures similar to the ambient temperature, and that the second condition is satisfied by suitably selecting the thermal decrement of the layers 15, 16.

To reduce external influences as much as possible peripheral conductive guard rings 17 are provided, each being subjected to the same thermal conditions as the absorbent layer which it surrounds, in order to prevent lateral heat exchange with this layer.

In an enclosed space without any wind or draught, for example, a greenhouse, the instrument can operate without the protection afforded by the hemispheres 13. In the open air, the hemispheres serve only to protect the instrument from bad weather, in particular wind and rain.

Figure 4:
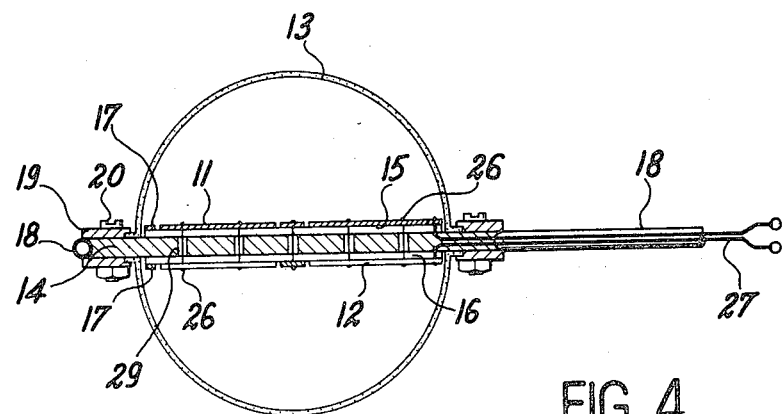
FIG. 4 is a cross-section along a plane IV—IV in FIG. 3.
Figure 3:
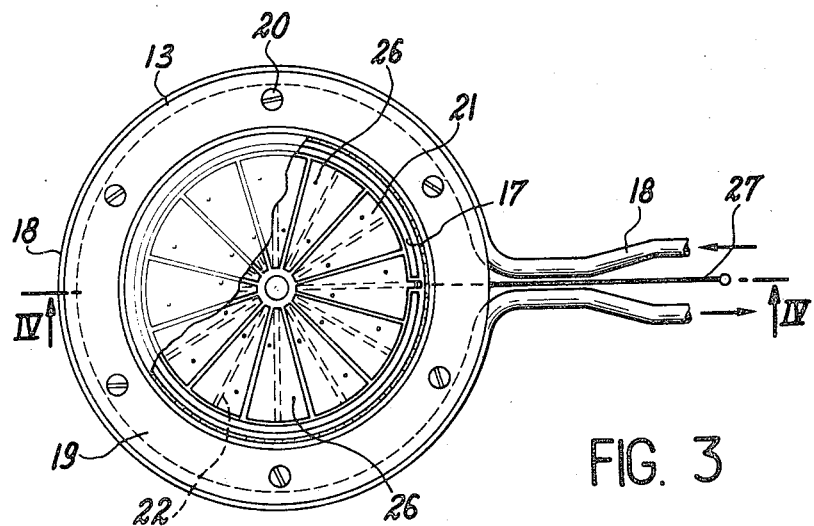
FIG. 3 is a plan view of one embodiment of the instrument in accordance with the invention.

FIGS. 3 and 4 illustrate an embodiment of apparatus of this kind for measuring the solar energy absorbed by the ground.

The central layer is formed by a thermally conductive copper disc 14 surrounded by a tube coil 18, also of copper, through which a stream of water is passed to keep the disc and coil at a temperature equal or similar to the ambient temperature.

The upper absorbent layer 11 is formed of silvered copper sectors 21, placed side by side in a circle with radial clearance and blackened to absorb all visible and invisible radiation. As shown, by way of example only, twelve 30° angular sectors are used. The lower absorbent layer 12 is formed in the same way of angular sectors 22, angularly offset by 15° relative to the upper sectors. Thermocouple junctions 26 are provided on the sectors, the thermocouples transmiting the measurements through copper output leads 27 to a suitably calibrated voltmeter (not shown) from which the value of the solar energy absorbed by the ground can be read. Passages 29 are provided in the disc 14 for the electrical connections between the thermocouple junctions of the two absorbent layers. The thermocouple wires may, for example, be made from Fe-constantan with a thickness of $50\mu$, since this material has a good e.m.f./thermal conductivity ratio.

The absorbent elements 21, 22 of the layers 11,12 may be of any shape and arrangement desired. In general it is better not to arrange them along a preferential axis since this might interfere with the measuring accuracy.

The instrument also includes guard rings 17 and two hemispheres 13 transparent to radiation, which are fixed to clamping rings 19 by means of screws and nuts 20 extending through the edge of the disc 14.

It will be clear that the details of the above described embodiment may be modified within the scope of the invention.

We claim:

1. An instrument for measuring the solar energy absorbed by a surface, the instrument including a flat thermally conductive element defining a pair of opposed faces, a first layer capable of absorbing solar radiation applied to one face of the element and a second layer capable of absorbing radiation reflected off the surface applied to the other face of the element, the element including a central thermally conductive layer, capable of being maintained at a temperature close to ambient temperature by means of a flow of fluid, and insulating layers separating the central layer from the absorbent layers whose thermal decrements are such that the temperatures of the absorbent layers can be maintained close to ambient temperature, and wherein the instrument includes thermocouples circuit means adapted to measure the difference between the thermal fluxes from each of the absorbent layers.

2. An instrument as claimed in claim 1, wherein the central conductive layer is formed by a copper disc surrounded by a tube coil through which the temperature-regulating water flows.

3. An instrument as claimed in claim 1, wherein each absorbent layer is formed of blackened silvered copper elements, the elements of each layer being juxtaposed in a single plane with slight clearance and providing an equal number of measuring points in the thermocouple circuit means.

4. An instrument as claimed in claim 3, wherein the blackened silvered copper elements of each layer are angular sectors of equal angles, juxtaposed radially with clearance to form a circular layer.

5. An instrument as claimed in claim 4, wherein the angular sectors in one absorbent layer are angularly offset relative to those in the other absorbent layer.

6. An instrument as claimed in claim 1, wherein a conductive guard ring surrounds each absorbent layer.

7. An instrument as claimed in claim 1, including hemispheres transparent to radiation for protecting the absorbent layers.

* * * * *